United States Patent
Lee et al.

(10) Patent No.: US 7,956,962 B2
(45) Date of Patent: Jun. 7, 2011

(54) TRANSFLECTIVE TYPE DISPLAY PANEL HAVING SUB PIXEL AREAS AND PARTICULAR TRANSMISSION AND REFLECTION ELECTRODE ARRANGEMENT AND DISPLAY APPARATUS HAVING THE SAME

(75) Inventors: Jae-Young Lee, Seoul (KR); Kee-Han Uh, Yongin-si (KR); Won-Sang Park, Yongin-si (KR); Hae-Young Yun, Suwon-si (KR); Jae-Hyun Kim, Suwon-si (KR); Young-Joo Chang, Suwon-si (KR); Irina Poundaleva, Yongin-si (KR); Sung-Eun Cha, Geoje-si (KR); Seung-Kyu Lee, Yongin-si (KR); Jae-Ik Lim, Chuncheon-si (KR); Sang-Woo Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 515 days.

(21) Appl. No.: 11/274,315

(22) Filed: Nov. 16, 2005

(65) Prior Publication Data

US 2006/0103792 A1    May 18, 2006

(30) Foreign Application Priority Data

Nov. 17, 2004  (KR) .................. 10-2004-0094295

(51) Int. Cl.
*G02F 1/1335* (2006.01)
*G02F 1/1343* (2006.01)

(52) U.S. Cl. .................... 349/114; 349/144
(58) Field of Classification Search ........... 349/114, 349/144
See application file for complete search history.

(56) References Cited

U.S. PATENT DOCUMENTS

| | | | |
|---|---|---|---|
| 6,452,654 B2 * | 9/2002 | Kubo et al. | 349/114 |
| 2001/0024257 A1 * | 9/2001 | Kubo et al. | 349/138 |
| 2004/0119905 A1 * | 6/2004 | Jang et al. | 349/56 |
| 2005/0168672 A1 * | 8/2005 | Tashiro et al. | 349/114 |

FOREIGN PATENT DOCUMENTS

| KR | 1020020015009 | 2/2002 |
|---|---|---|
| KR | 1020030028726 | 4/2003 |

* cited by examiner

*Primary Examiner* — Michael H Caley
(74) *Attorney, Agent, or Firm* — F. Chau & Associates, LLC (57) ABSTRACT

In a transflective-type display panel and a display apparatus having the transflective-type display panel, the transflective-type display panel includes a first display substrate, a second display substrate and a liquid crystal layer. The first display substrate includes a first substrate and a common electrode arranged on the first substrate. The second display substrate includes a second substrate having a main pixel area where a plurality of sub pixel areas are formed, a plurality of transmission electrodes formed in the sub pixel areas and coupled with each other, and a reflection electrode arranged in at least one sub pixel area. Thus, the transflective-type display panel improves a viewing angle and a display quality thereof and improves productivity.

18 Claims, 9 Drawing Sheets

TRANSFLECTIVE TYPE DISPLAY PANEL HAVING SUB PIXEL AREAS AND PARTICULAR TRANSMISSION AND REFLECTION ELECTRODE ARRANGEMENT AND DISPLAY APPARATUS HAVING THE SAME

CROSS-REFERENCE TO RELATED APPLICATIONS

This application claims priority to and the benefit of Korean Patent Application No. 10-2004-0094295, filed on Nov. 17, 2004, which is hereby incorporated by reference for all purposes as if fully set forth herein.

BACKGROUND OF THE INVENTION

1. Field of the Invention

The present invention relates to a display panel and a display apparatus having the display panel. More particularly, the present invention relates to a transflective-type display panel and such a display device.

2. Description of the Related Art

A liquid crystal display apparatus includes an array substrate, a color filter substrate facing the array substrate and a liquid crystal layer arranged between the array substrate and the color filter substrate.

The array substrate includes a plurality of pixels for displaying an image. Each pixel includes a gate line to which a gate signal is applied, a data line to which a data signal is applied, a thin film transistor connected to the gate line and the data line, and a pixel electrode applying a voltage to the liquid crystal layer in response to the data signal.

In a patterned vertical alignment (PVA) mode liquid crystal display apparatus, a common electrode formed on the color filter substrate has a predetermined pattern. Thus, a plurality of domains where liquid crystals between the common electrode and the pixel electrode are arranged in different directions from each other is formed. This improves a display quality and a viewing angle of the liquid crystal display.

However, productivity of the liquid crystal display apparatus decreases because of the complicated process for patterning the common electrode. Specifically, a small-sized or a medium-sized liquid crystal display apparatus has pixels that are relatively small, which makes the patterning process difficult. Further, display quality and light efficiency of the LCD apparatus decreases because of a misalignment between the patterned common electrode and the pixel electrode.

BRIEF SUMMARY OF THE INVENTION

The present invention provides a transflective-type display panel that is capable of improving a viewing angle and a display quality and increasing productivity.

Additional features of the invention will be set forth in the description which follows, and in part will be apparent from the description, or may be learned by practice of the invention.

The present invention discloses a display panel, including a first display substrate; a second display substrate facing the first display substrate; and a liquid crystal layer arranged between the first display substrate and the second display substrate, wherein the first display substrate includes a first substrate including a main pixel area having a plurality of sub pixel areas; a plurality of transmission electrodes arranged at the sub pixel areas of the first substrate and coupled with each other; and a reflection electrode arranged in at least one of the sub pixel areas.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It is understood that when an element or layer is referred to as being "on" or "connected to" or "connected with" another element or layer, it can be directly on or directly connected to or with the other element or layer or intervening elements or layers may be present.

The present invention is described below with reference to the accompanying drawings.

Figure 1:
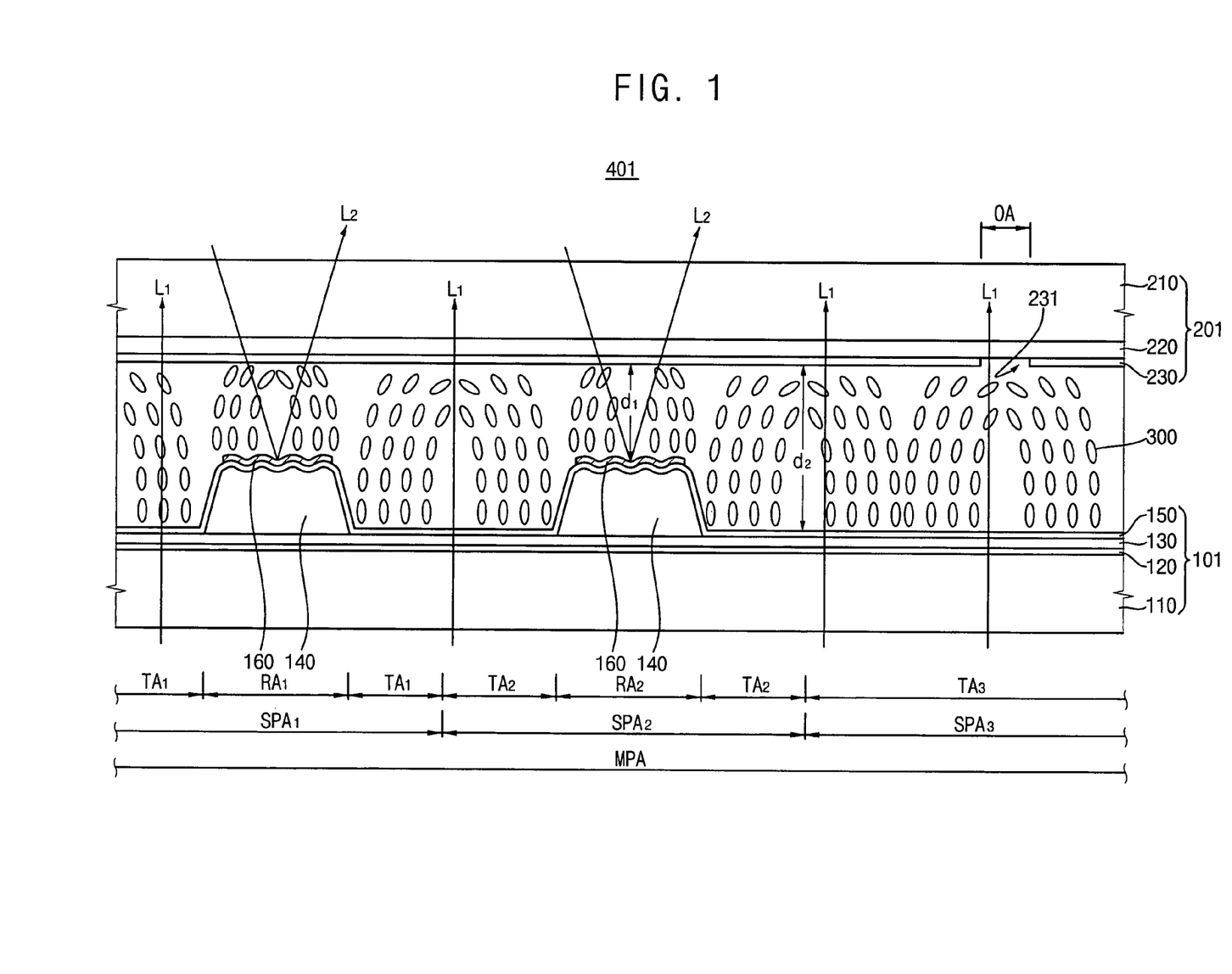
FIG. 1 is a cross-sectional view showing a transflective-type display panel according to an embodiment of the invention.
Figure 2:
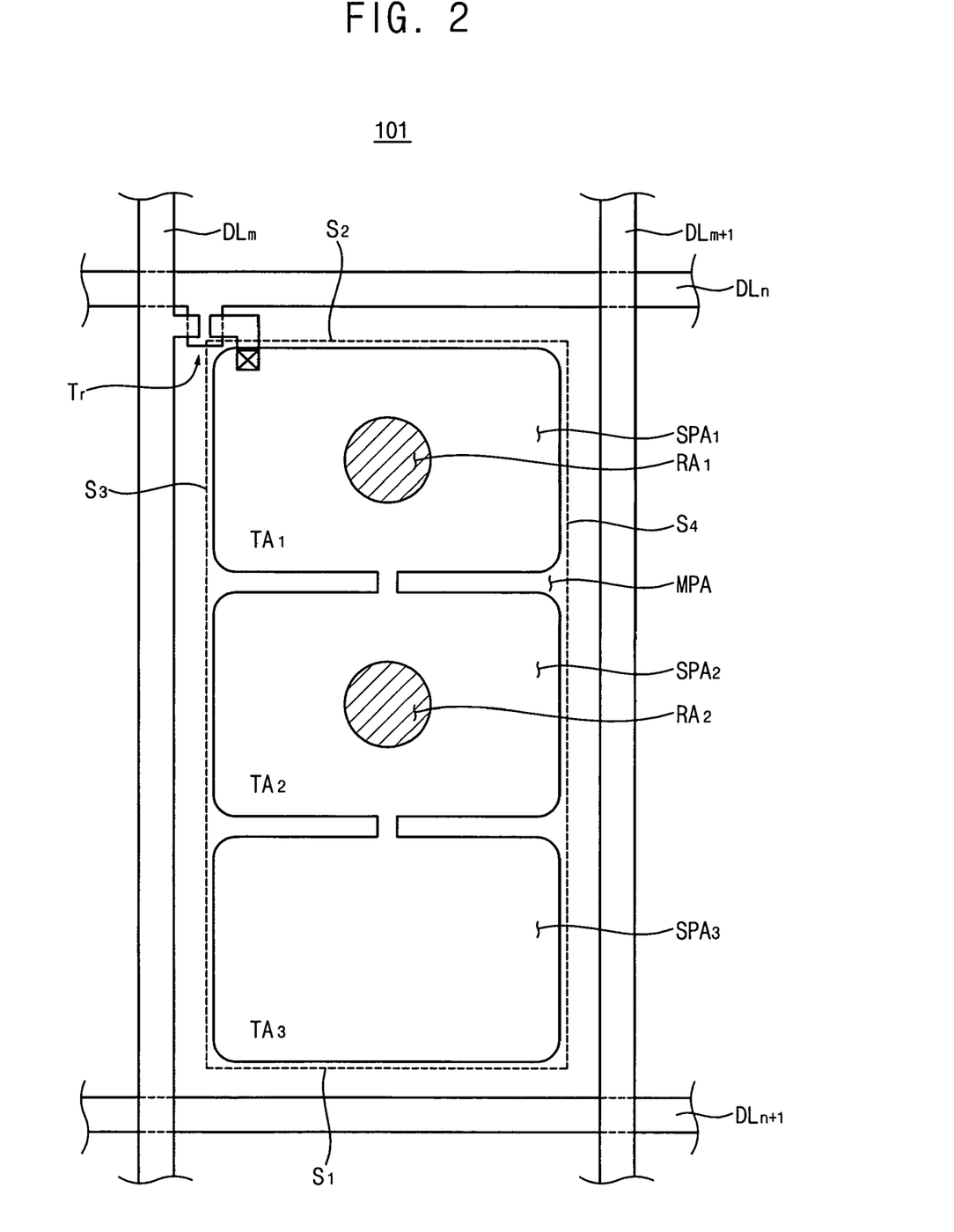
FIG. 2 is a plan view showing a first display substrate shown in FIG. 1.
Figure 3:
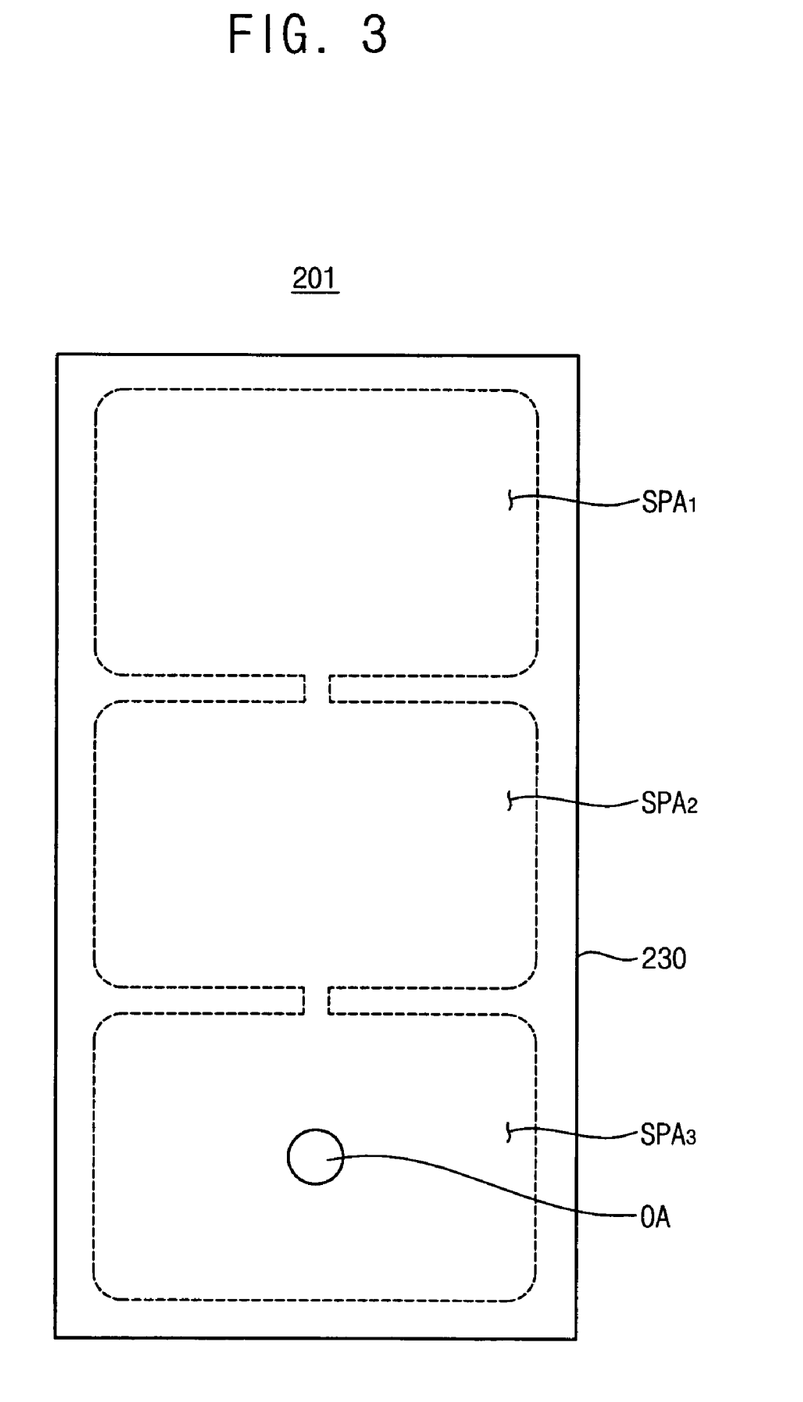
FIG. 3 is a plan view showing a second display substrate shown in FIG. 2.

FIG. 1 is a cross-sectional view showing a transflective-type display panel according to an embodiment of the invention. FIG. 2 is a plan view showing a first display substrate shown in FIG. 1. FIG. 3 is a plan view showing a second display substrate shown in FIG. 2. In the present invention, the transflective-type display panel includes a plurality of main pixel areas, but one main pixel area will be shown and described in FIGS. 1, 2, and 3 for purposes of convenience.

Referring to FIG. 1, a transflective-type display panel 401 includes a first display substrate 101, a second display substrate 201 facing the first display substrate 101, and a liquid crystal layer 300 arranged between the first display panel 101 and the second display substrate 201.

As shown in FIG. 2, the first display substrate 101 includes a main pixel area MPA formed therein. The main pixel area MPA is defined by an n-th gate line GLn, an (n+1)-th gate line GLn+1, an m-th data line DLm and an (m+1)-th data line, wherein n and m are natural numbers. A thin film transistor Tr is arranged adjacent to an end portion of the main pixel area MPA. The thin film transistor Tr includes a gate electrode branched from the n-th gate line GLn, a source electrode branched from the m-th data line DLm, and a drain electrode partially arranged on the gate electrode and spaced apart from the source electrode by a predetermined distance.

The main pixel area MPA may be divided into a first sub pixel area SPA1, a second sub pixel SPA2 and a third sub pixel SPA3. The main pixel area MPA has a substantially rectangular-like shape where a first side S1 and a second side S2 are substantially parallel to each other and each are shorter length than a third side S3 and a fourth side S4 that are substantially parallel to each other. In the present embodiment, the third side S3 and the fourth side S4 are at least three times longer than the first side S1 and the second side S2. Each of the first sub pixel area SPA1, the second sub pixel area SPA2, and the third sub pixel area SPA3 has a substantially rectangular-like shape. Corners of the first sub pixel area SPA1, the second sub pixel area SPA2, and the third sub pixel area SPA3 are curved.

The first sub pixel area SPA1, the second sub pixel area SPA2 and the third sub pixel area SPA3 are spaced apart from adjacent sub pixel areas by a predetermined distance. The first sub pixel area SPA1 is divided into a first transmission area TA1 and a first reflection area RA1, the second sub pixel area SPA2 is divided into a second transmission area TA2 and a second reflection area RA2. The third sub pixel area SPA3 is defined only as a third transmission area TA3. The first reflection area RA1 and the second reflection area RA2 are formed at center portions of the first sub pixel area SPA1 and the second sub pixel area SPA2, respectively. The first reflection area RA1 and the second reflection area RA2 have a substantially circular like shape.

Referring to FIG. 1, the first display substrate 101 includes a first substrate 110, a gate insulating layer 120, a passivation layer 130, an organic insulating layer 140, a transmission electrode 150, and a reflection electrode 160. The gate insulating layer 120 and the passivation layer 130 may be sequentially arranged on the first substrate 110 and correspond to the main pixel area MPA. The organic insulating layer 140 is arranged on the passivation layer 130 that corresponds to the first reflection area RA1 and the second reflection areas RA2. The organic insulating layer 140 includes a partially embossed surface.

The transmission electrode 150 is substantially uniformly arranged on the passivation layer 130 corresponding to the first transmission area TA1, the second transmission area TA2, and the third transmission area TA3 and on the organic insulating layer 140 corresponding to the first reflection area RA1 and the second reflection area RA2. The transmission electrode 150 is electrically connected, e.g., coupled, with the drain electrode of the thin film transistor Tr at the first sub pixel area SPA1. The transmission electrode 150 is then arranged in the first sub pixel area SPA1, the second sub pixel area SPA2, and the third sub pixel area SPA3.

The reflection electrode 160 is arranged on the transmission electrode 150 that corresponds to an area where the organic insulating layer 140 is arranged. Thus, the reflection electrode 160 arranged at the first reflection area RA1 and the second reflection area RA2 is electrically connected, e.g., coupled, with the drain electrode of the thin film transistor Tr through the transmission electrode 150. The reflection electrode 160 is substantially uniformly arranged on the transmission electrode 150. Thus, the reflection electrode 160 has substantially the same profile as the organic insulating layer 140, thereby improving reflectivity of the reflection electrode 160.

The first transmission area TA1, the second transmission area TA2, and the third transmission area TA3 transmit a first light L1 that is supplied from a rear side of the first substrate 110. The first reflection area RA1 and the second reflection area RA2 reflect a second light L2 that is supplied from a front side of the first substrate 110. Thus, the transflective-type display panel 401 may operate in a transmissive mode to display an image using the first light L1 or in a reflective mode to display the image using the second light L2.

Referring to FIG. 1 and FIG. 3, the second display substrate 201 includes a second substrate 210, a color filter layer 220, and a common electrode 230. The color filter layer 220 and the common electrode 230 may be sequentially arranged on the second substrate 210 corresponding to the main pixel area MPA of the first display substrate 101. The color filter layer 220 includes a plurality of color pixels, for example, a red color pixel, a blue color pixel, a green color pixel, or the like.

The common electrode 230 may be substantially uniformly provided on the color filter layer 220. To partially expose the color filter layer 220, a contact hole 231 may be formed through the common electrode 230. Thus, an opening area OA from which the common electrode 230 is partially removed is provided at the third sub pixel area SPA3. The opening area OA has a substantially circular shape and is positioned at a substantially center portion of the third sub pixel area SPA3.

The reflection electrode 160 may be spaced apart from the common electrode 230 by a first distance d1 in the first and second reflection areas RA1 and RA2. The transmission electrode 230 may be spaced apart from the common electrode 230 by a second distance d2 that is greater than the first distance d1 in the first transmission area TA1, the second transmission area TA2, and third transmission area TA3. As described above, a cell gap provided at the first transmission area TA1, the second transmission area TA2, and the third transmission area TA3 is greater than a cell gap provided at the first reflection area RA1 and the second reflection area RA2. Thus, when the transflective-type display panel 401 operates in the transmissive mode, a transmittance of the transflective-type display panel 401 may be improved.

The liquid crystal layer 300 is arranged between the first display substrate 101 and the second display substrate 201. In the first sub pixel area SPA1, liquid crystal molecules of the liquid crystal layer 300 are aligned at different angles from each other in relation to an interface between the first reflection area RA1 and the first transmission area TA1. Thus, domains having different liquid crystal alignment directions from each other are arranged at the first sub pixel area SPA1.

In the second sub pixel area SPA2, the liquid crystal molecules of the liquid crystal layer 300 are aligned at different angles from each other in relation to an interface between the second reflection area RA2 and the second transmission area TA2. Thus, domains having different liquid crystal alignment directions from each other are arranged at the second sub pixel area SPA2.

In the third sub pixel area SPA3, the liquid crystal molecules of the liquid crystal layer 300 are aligned at different angles from each other in relation to the opening area OA where the common electrode 230 is removed. Thus, domains having different liquid crystal alignment directions from each other are arranged at the third sub pixel area SPA3.

As described above, a plurality of domains having different liquid crystal alignment directions may be arranged at one main pixel area MPA due to a step difference between the reflection area and the transmission area of the transflective-type display panel 401. Thus, the transmittance and the viewing angle of the transflective-type display panel 401 may be improved.

Figure 4:
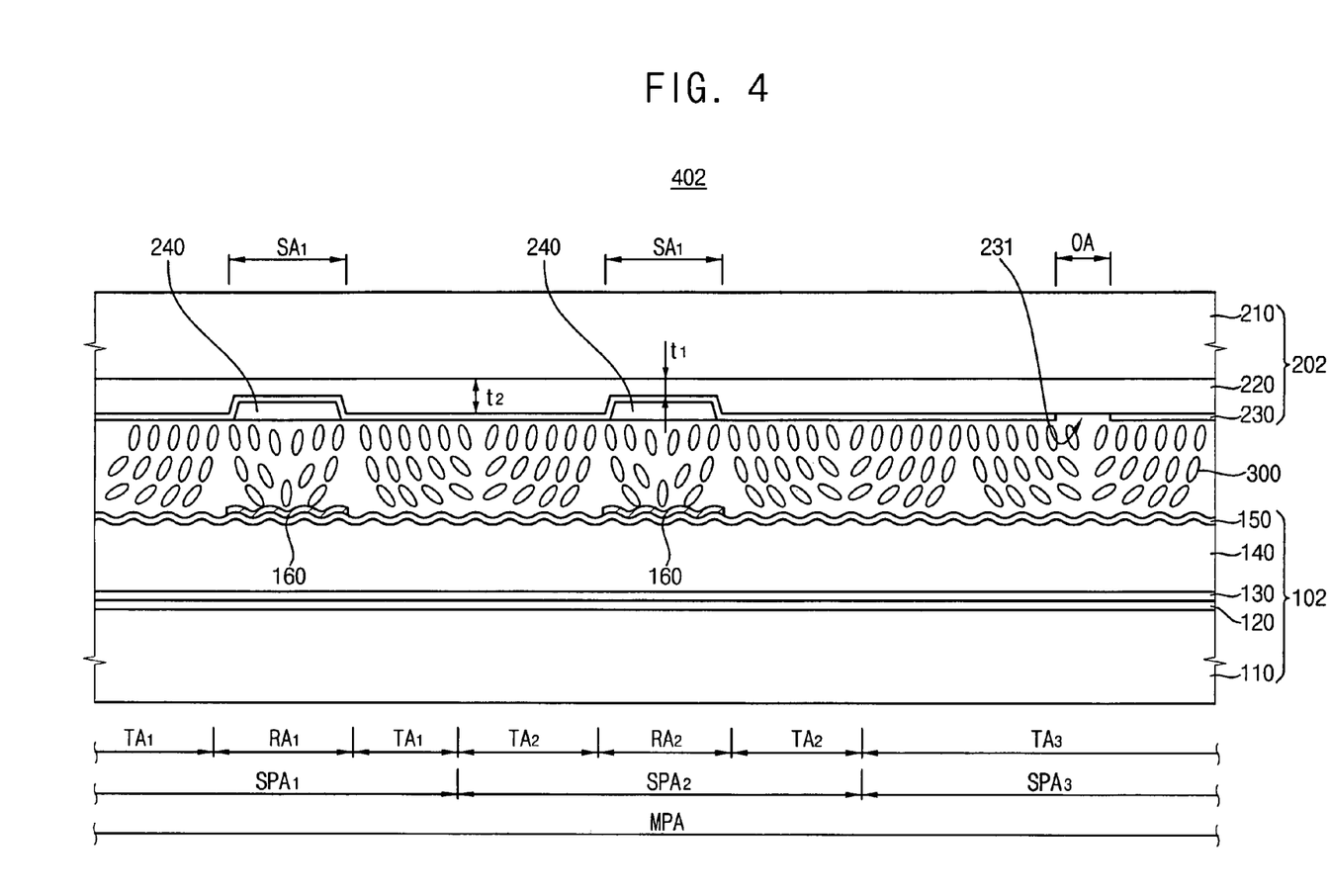
FIG. 4 is a cross-sectional view showing a transflective-type display panel according to another embodiment of the invention.
Figure 5:
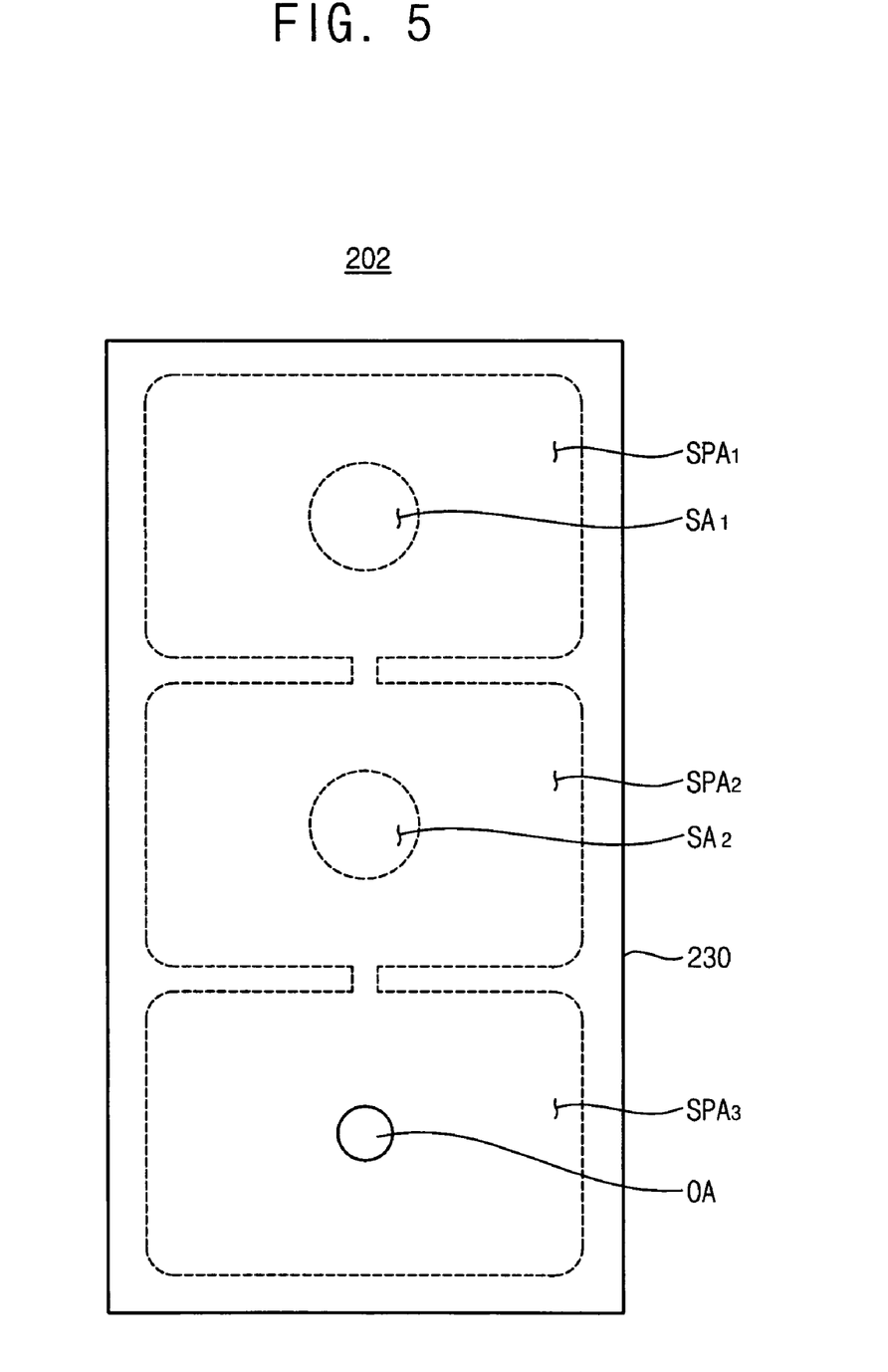
FIG. 5 is a plan view showing a second display substrate shown in FIG. 4.

FIG. 4 is a cross-sectional view showing a transflective-type display panel according to another embodiment of the invention. FIG. 5 is a plan view showing a second display substrate shown in FIG. 4.

Referring to FIG. 4, a transflective-type display panel 402 includes a first display substrate 102 and a second display substrate 202. The first display substrate 102 includes a first substrate 110, a gate insulating layer 120, a passivation layer 130, an organic insulating layer 140, a transmission electrode 150, and a reflection electrode 160. The gate insulating layer 120 and the passivation layer 130 may be sequentially arranged on an area of the first substrate 110 corresponding to the main pixel area MPA. The organic insulating layer 140 is arranged over the passivation layer 130, and the organic insulating layer 140 has an embossed surface.

The transmission electrode 150 is arranged over the organic insulated layer 140, and the reflection electrode 160 is arranged formed on the transmission electrode 150.

The main pixel area MPA includes a first sub pixel area SPA1, a second sub pixel area SPA2, and a third sub pixel area SPA3. The first sub pixel area SPA1 includes a first transmission area TA1 and a first reflection area RA1. The second sub pixel area SPA2 includes a second transmission area TA2 and a second reflection area RA2. The third sub pixel area SPA3 is defined only as a third transmission area TA3.

The transmission electrode 150 is arranged over the first sub pixel area SPA1, the second sub pixel area SPA2, and the third sub pixel area SPA3. The reflection area 160 is arranged at the first reflection area RA1 and the second reflection area RA2. The first sub pixel area SPA1, the second sub pixel area SPA2, and the third sub pixel area SPA3 are defined as the first transmission area TA1, the second transmission area TA2, and the third transmission area TA3, respectively; however, the first reflection area RA1 and the second reflection area RA2 are not included at the first transmission area TA1, the second transmission area TA2, and the third transmission area TA3.

The second display substrate 202 includes a second substrate 210, a color filter layer 220, a common electrode 230, and a planarization layer 240. The color filter layer 220 is arranged on the second substrate 202. The color filter layer 220 has a first thickness t1 at the first reflection area RA1 and the second reflection area RA2 and a second thickness t2 that is thicker than the first thickness t1 at the first transmission area TA1, the second transmission area TA2, and the third transmission area TA3. Since the second thickness t2 of the color filter layer 220 formed at the first transmission area TA1, the second transmission area TA2, and the third transmission area TA3 is thicker than the first thickness t1 of the color filter layer 220 formed at the first reflection area RA1 and the second reflection area RA2, a color reproducibility between the reflective mode and the transmissive mode of the transflective-type display panel 402 may be decreased.

As shown in FIG. 4, a first step difference area SA1 and a second step difference area SA2 are formed corresponding to the first reflection area RA1 and the second reflection area RA2, respectively, due to the increase of the second thickness t2 of the color filter layer 220 corresponding to the first transmission area TA1, the second transmission area TA2, and third transmission area TA3. For example, a step difference is provided between the first reflection area RA1 and the second reflective area RA2 and the first transmission area TA1, the second transmission area TA2, and the third transmission area TA3. In the present embodiment, the first step difference area SA1 and the second step difference area SA2 have a substantially circular-like shape, which is substantially the same shape as the first reflection area RA1 and the second reflection area RA2.

The common electrode 230 is substantially uniformly arranged on the color filter layer 220. The planarization layer 240 is arranged at the first reflection area RA1 and the second reflection area RA2, so that the step difference between the first reflection area RA1 and the second reflection area RA2 and the first transmission area TA1, the second transmission area TA2, and the third transmission area TA3 may be decreased.

The liquid crystal layer 300 is arranged between the first display substrate 102 and the second display substrate 202. Due to the step difference of the common electrode 230, liquid crystal molecules of the liquid crystal layer 300 are aligned at different angles from each other in relation to an interface between the first reflection area RA1 and the first transmission area TA1. Thus, domains having different liquid crystal alignment directions from each other are arranged at the first sub pixel area SPA1.

Due to the step difference of the common electrode 230, the liquid crystal molecules of the liquid crystal layer 300 are aligned at different angles from each other in relation to an interface between the second reflection area RA2 and the second transmission area TA2. Thus, domains having different liquid crystal alignment directions from each other are arranged at the second sub pixel area SPA2.

In the third sub pixel area SPA3, the liquid crystal molecules of the liquid crystal layer 300 are aligned at different angles from each other in relation to the opening area OA where the common electrode 230 is removed. Thus, domains having different liquid crystal alignment directions from each other are arranged at the third sub pixel area SPA3.

As described above, a plurality of domains having different liquid crystal alignment directions may be arranged at one main pixel area MPA due to a step difference between the reflection areas and the transmission areas of the transflective-type display panel 402. Thus, the transmittance and the viewing angle of the transflective-type display panel 402 may be increased.

Figure 6:
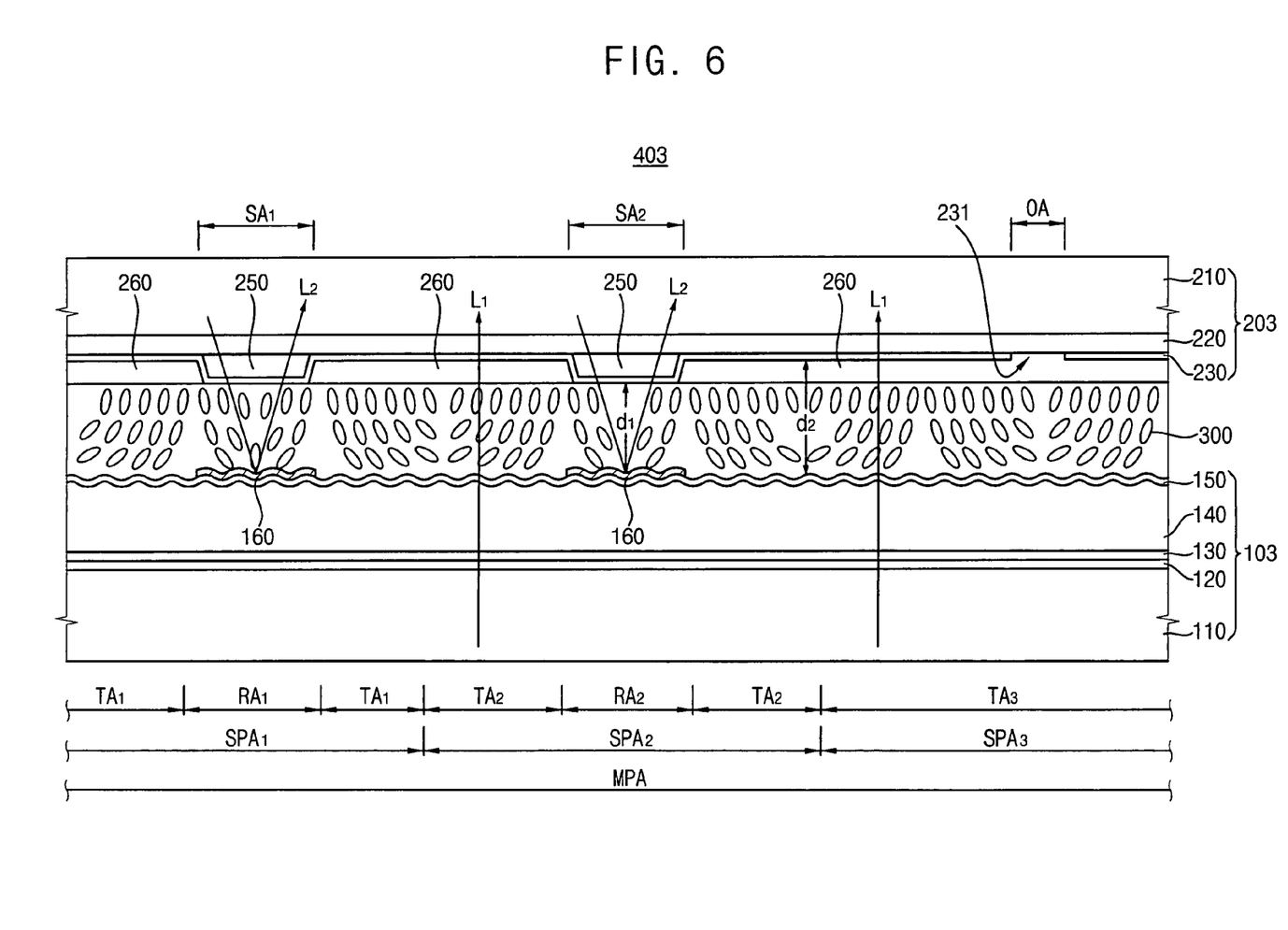
FIG. 6 is a cross-sectional view showing a transflective-type display panel according to another embodiment of the invention.

FIG. 6 is a cross-sectional view showing a transflective-type display panel according to another embodiment of the invention.

Referring to FIG. 6, a transflective-type display panel 403 includes a first display substrate 103 of which an organic insulating layer 140 is arranged over a first sub pixel area SPA1, a second sub pixel area SPA2, and a third sub pixel area SPA3, and a second display substrate 203 facing the first display substrate 103. A transmission electrode 150 and a reflection electrode 160 may be sequentially arranged on the organic insulating layer 140. The transmission electrode 150 is arranged over the first sub pixel area SPA1, the second sub pixel area SPA2, and the third sub pixel area SPA3, and the reflection electrode 160 is arranged at the first reflection area RA1 and the second reflection area RA2. In the first sub pixel area SPA1, the second sub pixel area SPA2, and third sub pixel area SPA3, areas where the reflection electrode 160 is not provided are defined as the first transmission area TA1, the second transmission area TA2, and the third transmission area TA3, respectively.

The second display substrate 203 includes a second substrate 210, a color filter layer 220, a first insulating layer 250, a second insulating layer 260, and a common electrode 230.

The color filter layer 220 is substantially uniformly arranged on the second substrate 210, and the first insulating layer 250 is arranged on the color filter layer 220 corresponding to the first reflection area RA1 and the second reflection area RA2. The common electrode 230 is arranged on the first insulating layer 250 corresponding to the first reflection area RA1 and the second reflection area RA2 and on the color filter layer 220 corresponding to the first transmission area TA1, the second transmission area TA2, and the third transmission area TA3. Thus, the common electrode 230 provided at the first reflection area RA1 and the second reflection area RA2 is spaced further apart from the second substrate 210 than the common electrode 230, which is arranged at the first transmission area TA1, the second transmission area TA2, and the third transmission area TA3. Thus, the common electrode 230 is spaced from the reflection electrode 160 by a first distance d1 at the first reflection area RA1 and the second reflection area RA2, and the common electrode 230 is spaced from the transmission electrode 150 at a second distance d2 that is greater than the first distance d1 in the first transmission area TA1, the second transmission area TA2, and the third transmission area TA3.

Thus, the transmittance of the transflective-type display panel 403 may be increased by increasing the second distance d2 between the common electrode 230 and the transmission electrode 150 at the first transmission area TA1, the second transmission area TA2, and third transmission area TA3.

The common electrode 230 includes a contact hole 231 through which at least a portion of the color filter layer 220 is exposed. The contact hole 231 is provided at the third transmission area TA3. The second insulating layer 260 is arranged on the common electrode 230 corresponding to the first transmission area TA1, the second transmission area TA2, and the third transmission area TA3. The second insulating layer 260 reduces the step difference between the first insulating layer 250 and the color filter layer 220, thereby substantially planarizing the surface of the second display substrate 203.

The liquid crystal layer 300 is arranged between the first display substrate 103 and the second display substrate 203. Due to the step difference of the common electrode 230, a plurality of domains are formed at the first sub pixel area SPA1 and the second sub pixel area SPA2. Liquid crystal molecules of the liquid crystal layer 300 have different liquid crystal alignment directions in the domains. In the third sub pixel area SPA3, the liquid crystal molecules of the liquid crystal layer 300 are aligned at different angles from each other in relation to the open area OA where the common electrode 230 is removed. Thus, domains having different liquid crystal alignment directions from each other are provided at the third sub pixel area SPA3.

As described above, since a plurality of domains may be formed in one main pixel area MPA, the transmittance and the viewing angle of the transflective-type display panel 403 may be increased.

Figure 7:
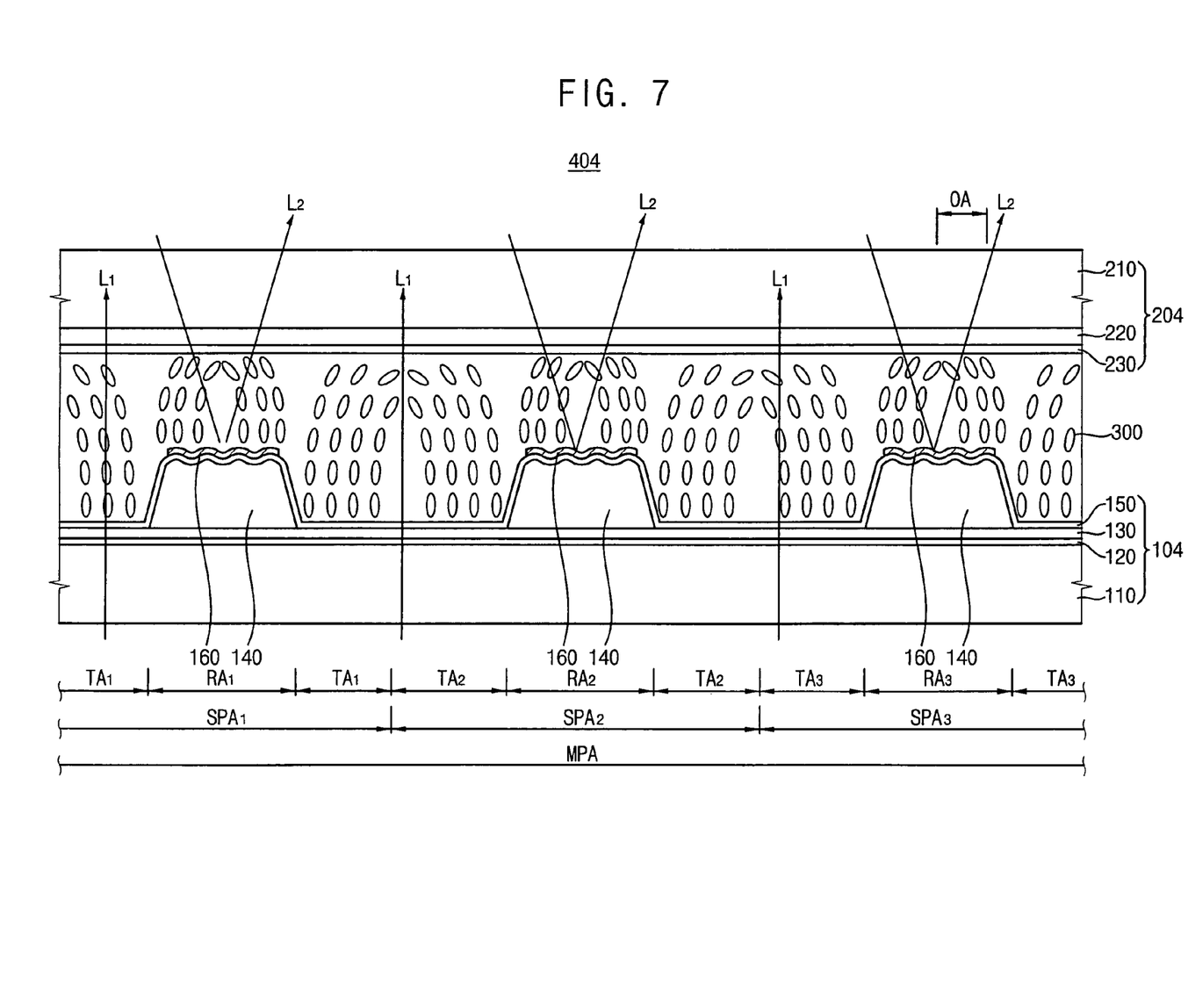
FIG. 7 is a cross-sectional view showing a display panel according to another embodiment of the invention.
Figure 8:
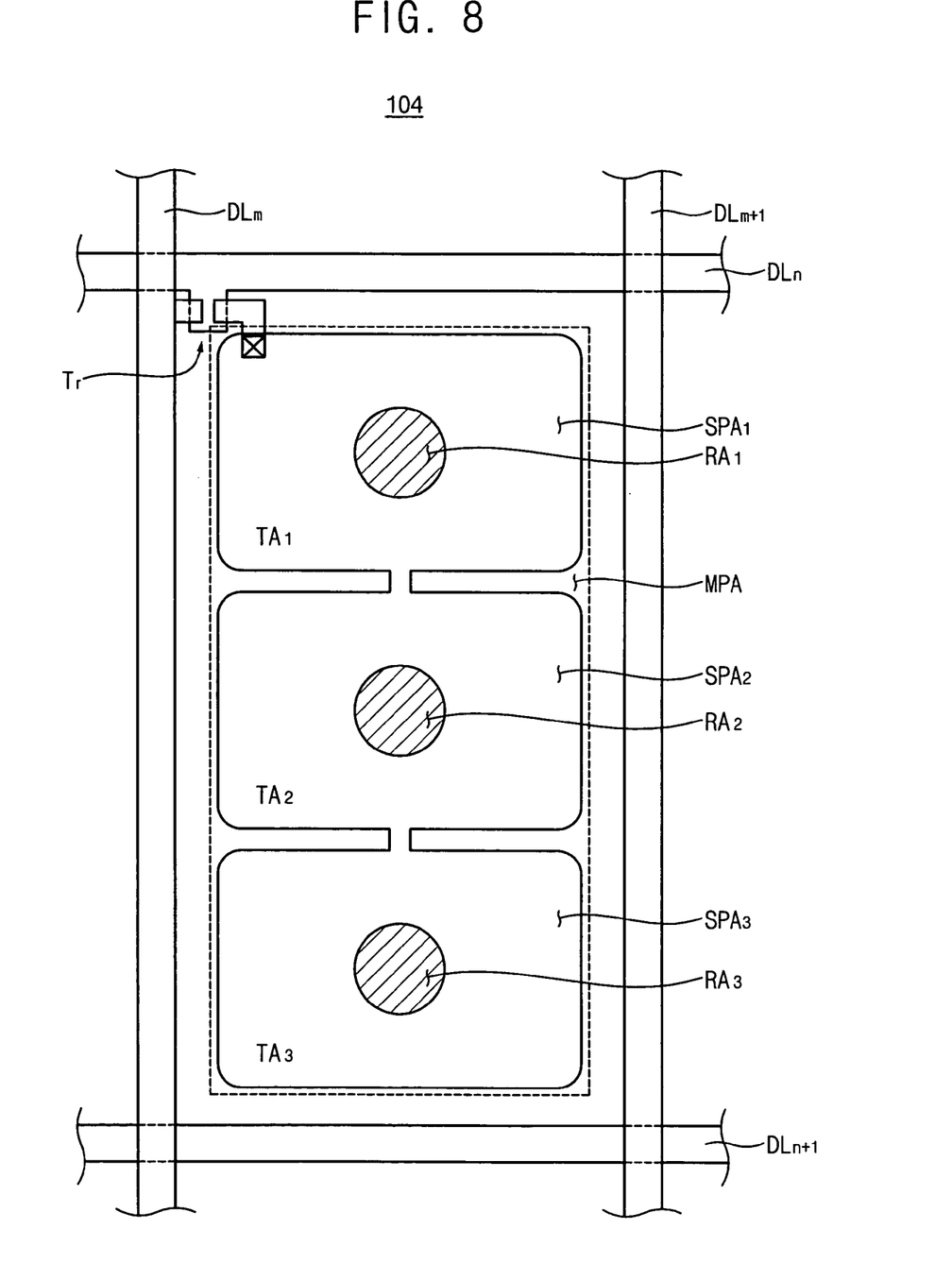
FIG. 8 is a plan view of a first display substrate shown in FIG. 7.

FIG. 7 is a cross-sectional view showing a display panel according to another embodiment of the invention. FIG. 8 is a plan view of a first display substrate in FIG. 7.

Referring to FIG. 7 and FIG. 8, a transflective-type display panel 404 includes a first display substrate 104, a second display substrate 204, and a liquid crystal layer 300. The first display substrate 104 includes a main pixel area MPA having a first sub pixel area SPA1, a second sub pixel area SPA2, and a third sub pixel area SPA3.

The first sub pixel area SPA1 includes a first transmission area TA1 and a first reflection area RA1, the second sub pixel area SPA2 includes a second transmission area TA2 and a second reflection area RA2, and the third sub pixel area SPA3 includes a third transmission area TA3 and a third transmission area RA3.

The first display substrate 104 includes a first substrate 110, a gate insulating layer 120, a passivation layer 130, an organic insulating layer 140, a transmission electrode 150 and a reflection electrode 160. The gate insulating layer 120 and the passivation layer 130 may be sequentially arranged on the first substrate 110 corresponding to the main pixel area MPA. The organic insulating layer 140 is arranged on the passivation layer 130 corresponding to the first reflection area RA1, the second reflection area RA2, and the third reflection area RA3. The organic insulating layer 140 has an embossed surface.

The transmission electrode 150 is substantially uniformly arranged on the passivation layer 130 corresponding to the first transmission area TA1, the second transmission area TA2, and the third transmission area TA3, and on the organic insulating layer 140 corresponding to the first reflection area RA1, the second reflection area RA2, and the third reflection area RA3. The reflection electrode 160 is then arranged on the transmission electrode 150 corresponding to an area where the organic insulating layer 140 is provided. Thus, the reflection electrode 160 is arranged at the first reflection area RA1, the second reflection area RA2, and the third reflection area RA3.

The first transmission area TA1, the second transmission area TA2, and the third transmission area TA3 transmit a first light L1, e.g., the first light L1 being supplied from a rear side of the first substrate 110, and the first reflection area RA1, the second reflection area RA2, and the third reflection area RA3 reflect a second light L2, e.g., the second light L2 being supplied from a front side of the first substrate 110. Accordingly, the transflective-type display panel 404 may display an image using the first light L1 or the second light L2.

The reflection electrode 160 of the transflective-type display panel 404 shown in FIG. 7 is arranged at the first pixel area SPA1, the second pixel area SPA2, and the third pixel area SPA3. Thus, the first reflection area RA1, the second reflection area RA2, and the third reflection area RA3 are arranged at the first pixel area SPA1, the second pixel area SPA2, and the third sub pixel area SPA3, respectively. That is, the transflective-type display panel 404 shown in FIG. 7 may have a larger reflection area than the reflective area of the transflective-type display panel 401 shown in FIG. 1.

However, the total size of the first reflective area RA1, the second reflective area RA2, and the third reflection area RA3 shown in FIG. 7 may be substantially equal to the total size of the first reflection area RA1 and the second reflection area RA2 shown in FIG. 1.

The second display substrate 204 includes a second substrate 210, a color filter layer 220, and a common electrode 230. The color filter layer 220 and the common electrode 230 may be sequentially arranged on the second substrate 210 corresponding to the main pixel area MPA of the first display substrate 104.

When the first, second and third reflection areas RA1, RA2 and RA3 are arranged at the first sub pixel area SPA1, the second sub pixel area SPA2, and the third sub pixel area SPA3, respectively, the common electrode 230 corresponding to the third sub pixel area SPA3 may be partially removed. Thus, a patterning process for the common electrode 230 may be omitted from manufacturing processes for the transflective-type display panel 404, thereby increasing productivity of the transflective-type display panel 404.

Figure 9:
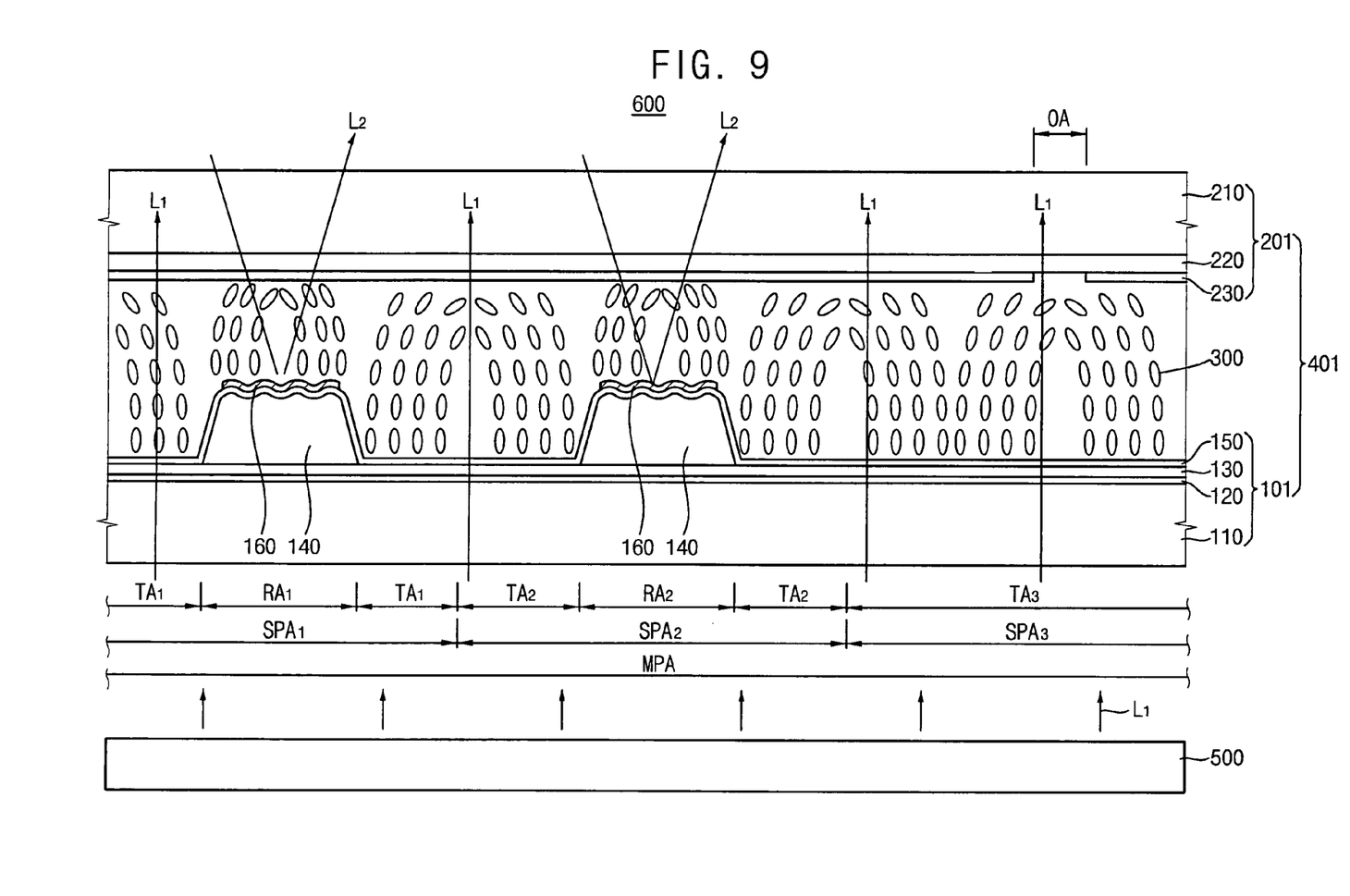
FIG. 9 is a cross-sectional view showing a transflective-type display apparatus according to an embodiment of the invention.

FIG. 9 is a cross-sectional view showing a transflective-type display apparatus according to an embodiment of the invention. In FIG. 9, same reference numerals denote the same elements in FIG. 1, and thus any repetitive description of the same elements will be omitted for purposes of convenience.

Referring to FIG. 9, a transflective-type display apparatus 600 includes a backlight assembly 500 that emits the first light L1 and the transflective-type display panel 401 that displays the image using the first light L1 from the backlight assembly 500 and the second light L2 provides externally. The transflective-type display panel 401 is arranged on the backlight assembly 500. In the present embodiment, a detail description of the transflective-type display panel 401 is omitted because it has same structure and function as those of the transflective-type display panel shown in FIG. 1.

The backlight assembly 500 is arranged adjacent to the first display substrate 101 of the transflective-type display panel 401. The first light L1 generated from the backlight assembly 500 is incident upon the first display substrate 101. A portion of the first light L1 incident upon the first display panel 401 may be blocked by the reflection electrode 160 provided on the first display substrate 101, and a remaining portion of the first light L1 may be transmitted to the second display substrate 201 after passing through the transmission electrode 150. Thus, the transflective-type display panel 401 may display the image using the remaining portion of the first light L1.

Alternatively, the second light L2 is incident upon the transflective-type display panel 401 through the second display substrate 201. A portion of the incident second light L2 may be reflected from the reflection electrode 160 provided on the first display substrate 101, and a remaining portion of the second light L2 exits the transflective-type display panel 401 after passing through the transmission electrode 150. Thus, the transflective-type display panel 401 may display the image using the second light L2 reflected from the reflection electrode 160.

According to at least the above described and illustrated embodiments of the display panel and the display apparatus, the reflection area is arranged at substantially the center portion of the sub pixel area, and the transmission area is arranged at a position that is adjacent to the reflection area. Thus, the domains are provided at the sub pixel area, thereby increasing the viewing angle and the display quality and improving the productivity of the transflective-type display panel and the transflective-type display apparatus.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents

What is claimed is:

1. A display panel, comprising:
   a first display substrate;
   a second display substrate facing the first display substrate; and
   a liquid crystal layer arranged between the first display substrate and the second display substrate, wherein the first display substrate comprises:
   a first substrate including a main pixel area having a plurality of sub pixel areas, wherein the main pixel area comprises a transmission area to transmit a first light applied thereto, and a reflection area to reflect a second light applied thereto;
   a first insulating layer formed on the first substrate in the sub pixel areas;
   a plurality of transmission electrodes arranged at the sub pixel areas of the first substrate and coupled with each other;
   a reflection electrode arranged in at least one of the sub pixel areas; and
   a second insulating layer formed on the first insulating layer under the reflection electrode and exclusively in the reflection area, wherein the stacked combination of the first and second insulating layers forms a stepped portion, wherein the transmission electrode comprises a first area on the first and second insulating layers that corresponds to the reflection area, a second area on the first substrate corresponding to the transmission area, and a third area surrounding a side surface of the second insulating layer, wherein the reflection electrode is arranged on the first area of the transmission electrode to create a step difference between the reflection area and the transmission area so that liquid crystal molecules of the liquid crystal layer are aligned at different angles from each other in relation to an interface between the reflection area and the transmission area,
   wherein the reflection electrode is surrounded by the sub pixel area in a plan view to be separated from an adjacent reflection electrode.

2. The display panel of claim 1, wherein the sub pixel areas have a substantially rectangular-like shape having at least one curved corner.

3. The display panel of claim 1, wherein the reflection area is arranged at a center portion of the sub pixel areas and is provided in at least one of the sub pixel areas, and
   wherein the reflection area comprises a substantially circular shape.

4. The display panel of claim 1, wherein the second insulating layer has an embossed surface.

5. The display panel of claim 4, wherein the first display substrate further comprises a thin film transistor provided on the first substrate, and
   the first insulating layer comprises a contact hole exposing a drain electrode of the thin film transistor.

6. The display panel of claim 5, wherein the transmission electrode is coupled with the drain electrode via the contact hole, and
   the reflection electrode is coupled with the drain electrode via the transmission electrode.

7. The display panel of claim 1, wherein the combination of the first and second insulating layers on the reflection area is thicker than the first insulating layer on the transmission area.

8. The display panel of claim 1, wherein the second display substrate comprises:
   a second substrate;
   a color filter layer arranged on the second substrate; and
   a common electrode arranged on the color filter layer.

9. The display panel of claim 8, wherein the color filter layer arranged at the reflection area is thicker than the color filter layer arranged at the transmission area.

10. The display panel of claim 8, wherein the second display substrate further comprises:
    a first insulating layer arranged between the color filter layer and the common electrode corresponding to the reflection area; and
    a second insulating layer arranged on the common electrode corresponding to the transmission area.

11. The display panel of claim 8, wherein the common electrode arranged on the second display substrate is partially removed, the removed portion corresponding to a substantially center portion of the sub pixel area where the reflection electrode is not arranged.

12. The display panel of claim 1, wherein the main pixel area comprises a substantially rectangular-like shape having a first side and a second side that are substantially parallel to each other and are shorter than a third side and a fourth side that are substantially parallel to each other, and wherein the third side and the fourth side are at least three times longer than the first side and the second side.

13. The display panel of claim 12, wherein the main pixel area comprises a first sub pixel area, a second sub pixel area, and a third sub pixel area.

14. The display panel of claim 13, wherein the reflection electrode is arranged in at least two sub pixel areas from among the first sub pixel area, the second sub pixel area, and the third sub pixel area.

15. A display apparatus, comprising:
a backlight assembly to emit a first light; and
the display panel of claim 1, wherein the display panel is arranged on the backlight assembly to display an image using the first light and the second light that is externally provided.

16. The display apparatus of claim 15, wherein
the first light is applied to the transmission area from a rear side; and
the second light is applied to the reflection area from a front side of the display panel.

17. The display apparatus of claim 16, wherein each of the sub pixel areas comprises a substantially rectangular-like shape, and
at least one corner of the sub pixel areas is curved.

18. The display apparatus of claim 16, wherein the reflection area is provided in at least one sub pixel area and is arranged at a center portion of the sub pixel areas, and
the reflection area comprises a substantially circular-like shape.

* * * * *